Sept. 11, 1962 F. C. HALLBERG 3,053,995
BLOCKING TRIGGER CIRCUIT ENABLED BY CLOCK AMPLIFIER
AND TRIGGERED BY SIGNAL IMPULSES
Filed Dec. 15, 1958
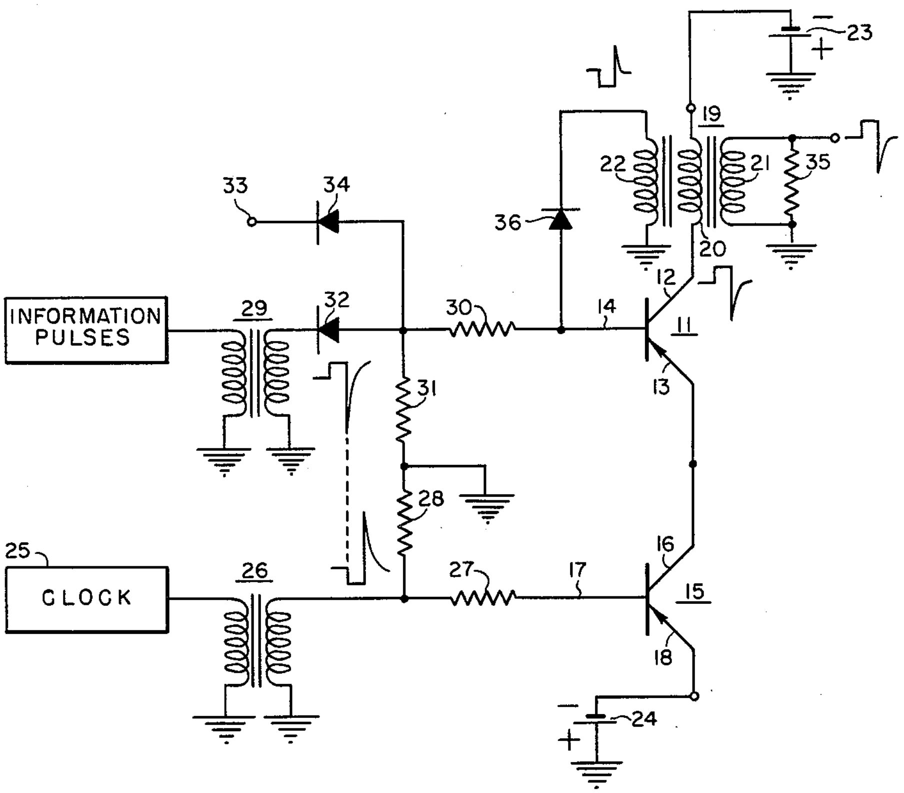
INVENTOR
FREDERICK C. HALLBERG
BY Richard C. Reed
ATTORNEY United States Patent Office 3,053,995
Patented Sept. 11, 1962

3,053,995

BLOCKING TRIGGER CIRCUIT, ENABLED BY CLOCK AMPLIFIER AND TRIGGERED BY SIGNAL IMPULSES

Frederick C. Hallberg, Silver Spring, Md., assignor to the United States of America as represented by the Secretary of the Navy Filed Dec. 15, 1958, Ser. No. 780,644
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to gated amplifiers. More particularly the invention relates to a novel gated transistor amplifier which is particularly useful in computer and related pulsed signal circuits.

The invention is concerned principally with computers of the type where information is represented by the presence or absence of a pulse in each of a number of separate preselected time intervals. Such computers generally contain a master clock which establishes the preselected time intervals by simultaneously enabling or disabling certain circuits in various parts of the computer. As the information pulses pass between these circuits, however, they are subjected to unavoidable delay and attenuation. As a result the shape and amplitude of the pulses are altered until these pulses are no longer capable of controlling the circuits to which they are applied.

It is, therefore, necessary to provide a means for correcting the shape and amplitude of the pulses in various signal paths of the computer. Such a means must be capable of amplifying, widening, narrowing, or otherwise reshaping the pulse, in addition to synchronizing the time position of the pulse with the control signals from the master clock. Since these circuits are frequently employed in mobile units, it is desirable that the circuit be rugged, compact, reliable, lightweight and efficient as regards power consumption.

An object of the present invention is, therefore, to provide a circuit, having the desirable properties set forth above, which is simple and inexpensive.

A further object of the invention is to provide a transistorized computer pulse forming circuit which is triggered by information pulses in which the shape and time position of the output pulses is controlled by clock pulses.

Referring to the drawings there is shown a circuit according to the present invention. The circuit employs a pnp type output transistor amplifier 11 and gating transistor amplifier 12 serially connected so that current from the collector 16 of the gating transistor supplies current to the emitter 13 of the output transistor. Type 2N240 transistors are satisfactory although other types may obviously be used. The collector 12 of the output transistor is connected to one terminal of the primary winding 20 of an output transformer 19. The opposite end of winding 20 is connected to a D.C. collector current source 23 which provides a collector potential of approximately 4 volts negative. The emitter 18 of the gating transistor is connected to bias source 24, which maintains the emitter approximately 0.5 v. below the common return.

Clock pulses are supplied from source 25 through an output pulse transformer, which is usually an integral part of the source, through a current limiting resistor 27 to the base 17 of the gating transistor. The base is also connected to the common return through the base return resistor 28 and resistor 27 in series therewith. The current limiting resistor 27 may be 4700 ohms and the base return resistor 10,000 ohms, as an example.

Information pulses are applied to the base 14 of the output transistor through pulse transformer 29, which usually will be an integral part of such a source, and current limiting resistor 30. Base return resistor 31 couples the base 14 to the common return via resistor 30 in series therewith. Resistors 30 and 31 may have the same values, respectively, as resistors 27 and 28. A diode 32 may be inserted in the input ahead of isolating resistor 30, if it is desired to feed additional pulses from a second information source. The second source is connected to an auxiliary input terminal 33 which is isolated from the input of transistor 11 by the diode 34. Type 1N126 crystal diodes may be used for this purpose.

The output signal is developed across a secondary winding 21 of the transformer 19. A damping resistor 35 is connected across the secondary winding to reduce the amplitude of any oscillations resulting from transformer overshoot.

A regenerative feedback path is provided by connecting one end of a tertiary winding 22 of transformer 19 to the base of transistor 11. The opposite end of winding 22 is connected to the ground return. A diode 36 is serially inserted in the feedback circuit in order to isolate the base 14 from ground. A suitable turns ratio for the output transformer 19 is 75 turns of the primary winding 20, to 50 turns in the secondary winding 21 and 40 turns in the tertiary winding 22. Diode 36 may be a type 1N126 crystal diode.

The operation of the circuit is as follows. The clock 25 supplies a series of negative input pulses to the gated transistor 15, which have the width and time position desired of output pulses from the circuit. The clock pulses lower the base voltage on the gating transistor 15 and cause the flow of emitter current to the base. The impedance to collector current flow is, therefore, reduced, but no collector current flows because the high impedance of the output transistor amplifier is present in the collector circuit. On the other hand, if the impedance of the output amplifier is lowered by a negative information pulse simultaneously applied to the base 14, emitter current flows through the low impedance collector circuit of the gated transistor amplifier and collector current flows in both amplifiers. No collector current flows when an information pulse alone is applied because emitter current in the output amplifier cannot flow through the normally high impedance collector circuit of the gated amplifier.

When collector current flows in the output transistor 11 the primary winding of the output transformer 19 is energized and pulses are induced in both the output and the feedback windings. The feedback winding is polarized to generate a negative pulse which passes through the diode 36 to augment the voltage on the base. This regenerative action not only increases the amplification of the output amplifier, but also extends the period over which the amplifier is conducting.

Thus, the width of the output pulse is determined only by the width of the clock pulse. This makes triggering of the circuit by the information pulses less critical. The information pulse need only occur slightly before and after the initiation of a clock pulse. It is, therefore, permissible to use the narrow negative overshoot of the information pulses, as shown in the drawing rather than the wider, but lower amplitude, positive portion of these pulses. When the time position of the information pulses is not accurately determinable or varies, it may be desirable to use the wider positive portions. A similar circuit for positive information pulses is obtained by using npn type transistors and reversing the polarities throughout the circuit.

Since many variations of the specific embodiment described above will occur to those skilled in the art, the invention is to be limited only as specified in the following claims.

What is claimed is:

1. A gated amplifier circuit comprising, an output amplifier having a first signal input for signals to be amplified and a signal output, gating means connected to said output amplifier to enable said amplifier in response to a gating signal, clock means coupled to said gating means for supplying thereto a standard gating signal, and transformer coupled positive feedback means for coupling said signal output only to said first signal input whereby the amplitude and duration of applied input pulses are augmented.

2. A gated transistor amplifier circuit comprising, an output transistor having a first emitter, a first collector and a first base, a gating transistor having a second emitter, a second collector, and a second base, circuit means connecting said first and second bases to a common current return, said second collector being connected to said first emitter, a source of biasing direct current connected between said common return and said second emitter, an output transformer having a primary, a secondary and a tertiary winding, one end of said primary winding being connected to said first collector, a source of collector current connected between said common return and the other end of said primary winding, a load circuit connected across said secondary winding, a regenerative feedback path having an input end connected to one end of said tertiary winding having an output end connected to said first base, the other end of said tertiary winding being connected to said common return, first input circuit means coupled to said first base for applying information signal pulses to said output transistor, a source of standard gating pulses, a second input circuit means coupled to said second base and said source of standard gating pulses for applying said gating pulses to said gating transistor.

3. The circuit according to claim 2 wherein said first input means includes a first diode means to apply to said first base only the portions of the input pulse which have a given polarity and said feedback circuit includes a second diode means for isolating said tertiary winding from said base for pulses of said given polarity.

4. A gated amplifier circuit comprising; a first and a second transistor amplifier serially interconnected so that the same current flows through the collector circuit of both; a source of clock pulses based on a standard time code connected to the input of first transistor amplifier; a source of information pulses based on the same standard time code connected to the input of said second transistor amplifier; an output transformer having a primary winding serially interposed in said collector circuits, said output transformer having a feedback winding; and a unidirectional current conduction element coupling said feedback winding to the input of said second transistor amplifier.

References Cited in the file of this patent

UNITED STATES PATENTS

| | | |
|---|---|---|
| 2,758,208 | Grayson | Aug. 7, 1956 |
| 2,760,087 | Felker | Aug. 21, 1956 |
| 2,810,080 | Trousdale | Oct. 15, 1957 |
| 2,831,126 | Linvill et al. | Apr. 15, 1958 |
| 2,831,987 | Jones | Apr. 22, 1958 |